No. 798,778. PATENTED SEPT. 5, 1905.
C. C. GARRISON.
NUT LOCK.
APPLICATION FILED JAN. 28, 1904.

Fig 1.

Fig 2.    Fig 3.

Witnesses  Charles C. Garrison, Inventor.
John Maupin.  By his Attorneys.
Louis G. Julihn
C.A. Snow & Co.

UNITED STATES PATENT OFFICE.

CHARLES CRAWFORD GARRISON, OF TRUCKEE, CALIFORNIA.

NUT-LOCK.

No. 798,778.   Specification of Letters Patent.   Patented Sept. 5, 1905.

Application filed January 28, 1904. Serial No. 191,036.

*To all whom it may concern:*

Be it known that I, CHARLES CRAWFORD GARRISON, a citizen of the United States, residing at Truckee, in the county of Nevada and State of California, have invented a new and useful Nut-Lock, of which the following is a specification.

My invention relates to a novel nut-lock designed for use in any connection where it is desirable or necessary to permit a nut to be screwed on a bolt or other threaded part and to prevent it from being unscrewed except by design.

In many connections the retention of a nut upon a bolt or the like is impossible by reason of vibration which tends to gradually effect the turning of the nut and its ultimate release. This particularly is true in bridge construction and in vehicles of various classes where the vibration is not only violent, but practically continuous.

My invention therefore comprehends the novel construction of a nut and its coöperating threaded member, which precludes the possibility of relative rotation of the parts in one direction except by design, in which event the application of a wrench to the nut effects a rearrangement of the elements constituting the lock and permits the nut to be turned in either direction.

Referring to the drawings, Figure 1 is a perspective view of my nut-lock applied as in use. Fig. 2 is a transverse sectional view through the bolt and attached nut, and Fig. 3 is a detail perspective view of the dog or pawl and its spring.

Referring to the numerals of reference indicating corresponding parts in the several views, 1 indicates a bolt provided with screw-threads 2 at one extremity and with a head 3 at its opposite extremity, as usual. The threads 2 differ from the usual threaded portions of bolts or similar devices in that they are not continuous, but are interrupted at a number of peripheral points—as, for instance, by diametrically opposite longitudinal grooves 4, extending, preferably, the entire length of the threaded portion to the base of the threads or deeper, if desired, and having the walls 5 disposed radially and the other walls 6 disposed at substantially right angles thereto.

7 indicates my improved nut, provided with a threaded bore 8 for the reception of the threaded bolt and provided with a bell-crank dog or pawl 9, the end of which engages the grooves in the bolt and constitutes a pivoted lock designed to prevent relative movement of the nut and bolt in a direction which would effect their disconnection.

Inasmuch as it is designed to effect the release of this lock by the application of a wrench to the nut and as it is desired that the part contacting with the wrench shall be depressed within the face of the nut to permit the wrench-jaws to contact directly with the latter, it is necessary that a special construction be employed to effect this relation of parts. Therefore contiguous edge faces of the nut are provided, respectively, with communicating recesses 10 and 11, in the bottom wall of the former of which is formed an opening 12, extending into the bore 8 for the reception of the curved engaging end 13 of the lock 9, which extends through the aperture 12 and into engagement with the grooves formed in the bolt.

The bell-crank pawl is pivoted, as by a pintle 14, within the recess, or rather at the juncture of the two recesses 10 and 11 at one corner of the nut, and from the pivot, or rather from a point slightly above it, extends substantially at right angles to the pawl or dog proper a locking-spring 15, which is formed integral with and forms a part of the bell-crank pawl and is slightly curved longitudinally and disposed with its free end supported upon the bottom wall of the recess 11 at the corner of the nut opposite the pintle 14, the latter passing through an enlargement 14′, formed at the juncture of the spring and pawl, as shown.

Inasmuch as the locking-spring is slightly curved, as stated, its central portion will project slightly beyond the face of the nut, while its extremities will lie practically flush therewith or possibly slightly below the face. It will now be seen that the normal tendency of the locking-spring 15 will be to urge the pawl into engagement with the grooves 4 of the bolt and that movement of the nut in one direction will be prevented by the extremity of the pawl in engagement with the radial face of the groove, while movement of the nut in the opposite direction will be permitted by the tangential wall 6, disposed at an angle to the direction of movement of the engaging end of the pawl. Thus the nut is effectively locked against movement in the direction which would effect its removal, but may be screwed upon the bolt without other than the usual operation. If now it is desired to remove the nut, the wrench is applied so that one of its jaws will first depress the center of the locking-spring 15 below the face of the nut, against which latter the jaw directly contacts, and as this depression of the spring effects the disengagement of the pawl from the bolt the nut may be unscrewed without the force of the wrench being applied in a manner which might cause the accidental derangement of the parts.

It may be noted in conclusion that the recess 10 is comparatively shallow at the end opposite the pintle 14, this structural peculiarity being necessary in order to provide a bearing or supporting-ledge 16 for the end of the locking-spring 15.

From the foregoing it will be observed that I have produced a simple, durable, and efficient nut-lock the release of which is effected by the application of a wrench; but while the present embodiment of my invention appears at this time to be preferable I desire to reserve the right to change, modify, and vary the structural features in any manner comprehended within the scope of the protection prayed.

What I claim is—

In a nut-lock, the combination with a threaded bolt provided with a pair of longitudinally-disposed locking-grooves extending the entire length of the threaded portion of the bolt, of a nut having communicating seating-grooves formed in the central portions of its adjacent faces, one of which gradually decreases in depth from the point of intersection of said grooves to the edge of the nut and the adjacent groove having its end wall curved and extending from one corner of the nut toward the center of the bolt, there being a pawl-receiving opening formed in the rear wall of the last-named seating-groove communicating with the bolt and forming a continuation of said groove, a bell-crank pawl pivoted at the intersection of the seating-grooves and having one end thereof bowed laterally and its terminal portion curved inwardly through the pawl-receiving opening and disposed substantially parallel with the curved end wall of said opening for engagement with the locking-grooves of the bolt, the opposite end of the pawl being reduced to form a bowed spring an intermediate portion of which is normally projected beyond the general plane of the contiguous side of the nut while its free end is slidable upon the inclined wall of the adjacent seating-groove, a perforate enlargement formed at the juncture of the spring-pawl, and a pintle passing through the perforation in said enlargement and engaging the nut at the intersection of the seating-grooves.

In testimony that I claim the foregoing as my own I have hereto affixed my signature in the presence of two witnesses.

CHARLES CRAWFORD GARRISON.

Witnesses:
J. H. JOCHUM, Jr.,
J. ROSS COLHOUN.